United States Patent [19]

Kuenemund

[11] 3,865,990

[45] Feb. 11, 1975

[54] RADIO RELAY SYSTEMS

[75] Inventor: Friedrich Kuenemund, Munich, Germany

[73] Assignee: Siemens Aktiengesellschaft, Berlin and Munich, Germany

[22] Filed: Mar. 22, 1973

[21] Appl. No.: 343,854

[30] Foreign Application Priority Data

Mar. 22, 1972 Germany.......................... 2213962

[52] U.S. Cl....................... 179/15 FD, 325/3, 333/6, 333/28 R, 343/200

[51] Int. Cl............................................. H04j 1/08

[58] Field of Search......... 179/15 FD; 325/3; 333/1, 333/1.1, 6, 28; 343/176, 200, 202

[56] References Cited

UNITED STATES PATENTS 3,273,064 9/1966 Kuenemund....................... 343/200

*Primary Examiner*—Robert L. Griffin
*Assistant Examiner*—Marc E. Bookbinder
*Attorney, Agent, or Firm*—Hill, Gross, Simpson, Van Santen, Steadman, Chiara & Simpson

[57] ABSTRACT

A radio relay system in which a multiplex link is formed between a transmitting station and a receiving station via a plurality of adjacent high frequency channels comprising a group. Each channel has a channel filter in each station connected to an associated circulator that forms part of a cascade of circulators fed by or feeding the associated antenna. The filter elements of the group are connected in mutually opposite sequences relative the associated antenna with the circulator most remote from each antenna having a circulation direction opposite to that of the other circulators in the respective cascade.

4 Claims, 2 Drawing Figures

RADIO RELAY SYSTEMS

BACKGROUND OF THE INVENTION

1. Field of the Invention

This invention relates to radio relay systems and in particular to such systems in which a link between a transmitting station and a receiving station provides a plurality of adjacent high frequency channels, each station including a cascade of circulators, each with an associated band-pass filter to form the channel filters of a common high frequency group.

2. Description of the Prior Art

The multiplex transmission of data signals in the microwave frequency range is commmonly achieved by forming a predetermined arrangement of individual channel frequencies into a high frequency group to be transmitted via a radio link using only one transmitting antenna and one receiving antenna. The antenna at the transmitting end is fed by the individual channel frequency signals via separate filter circuits, and at the receiving end the individual channels are separated again via respective filter circuits which are generally constructed in similar fashion to those at the transmitter. However, if individual channels are linked or separated from one another without special measures being taken in the relevant filter circuit, the transit time behavior of the individual channels will differ in such manner that substantially different types of transit time correctors must be used for transit time compensation in the respective channels. To overcome these difficulties, at least in part, U.S. Pat. No. 3,273,064 proposes a radio relay link in which means are provided in the connection of the individual channel circulators of the cascades in the transmitting and the receiving stations to ensure that the number of total reflections and the number of filter flanks which codetermine transit time distortions on the transmission path from the transmitter to the receiver become equal to the number of total reflections and the number of effective filter flanks in every other channel, a corrector network being provided for each single channel.

In this special design of a radio system, the transit time distortions of the, or each of the, middle channels of a frequency group are then equal to one another, but the transit time behavior is only approximately equal for any of the terminal channels, i.e., a channel at the end of a frequency group. This is found to be particularly disturbing, since identical transit time correctors are much to be preferred for all the channels in the intermediate frequency plane, and the above mentioned discrepancy makes this unsatisfactory.

SUMMARY OF THE INVENTION

One object of the present invention is to provide an arrangement which avoids the above-mentioned difficulties and enables the construction of a radio relay transmission link in which complete and uniform component assemblies including transit time correctors can be used, without subsequent compensation on the radio relay link being required, even when such component assemblies need to be interchanged.

The invention resides in the provision of a radio relay system in which a multiplex link is formed between a transmitting station and a receiving station via a plurality of adjacent high frequency channels comprising a group, each channel having a respective channel filter in each station connected to an associated circulator that forms part of a cascade of circulators fed by or feeding the associated antenna. The individual channel filter elements of the group are connected in mutually opposite sequences relative to the associated antenna in the receiving station and the transmitting station. The circulator most remote from its associated antenna in each station is so arranged or connected that the transit time characteristics of the associated channels are substantially equal to those of the, or each, central freqency channel.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENT

Figure 1:
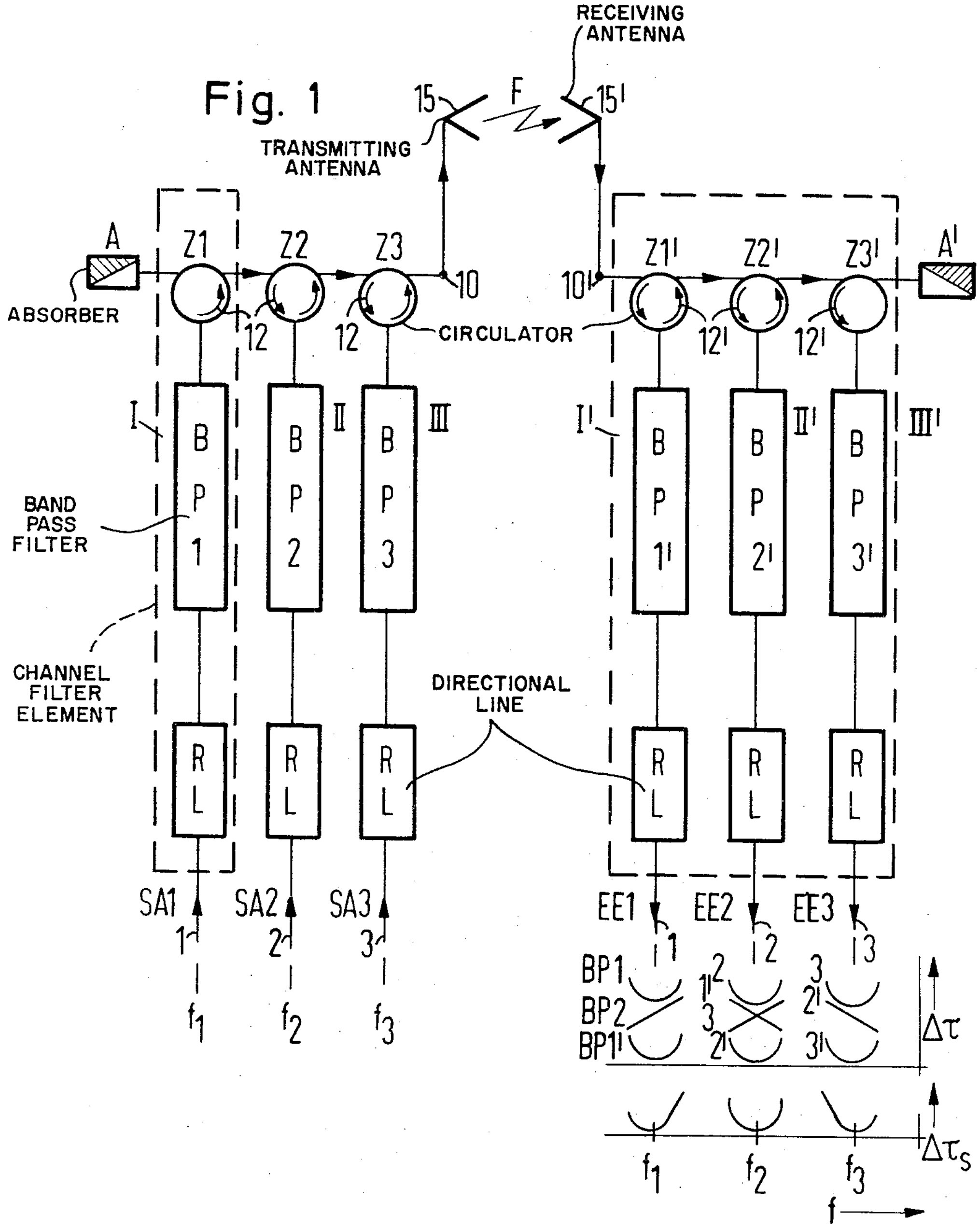
FIG. 1 is a block schematic diagram showing the construction of a known radio link.

To clarify the problem, FIG. 1 illustrates one of the possible constructions of a radio link as disclosed in the U.S. Pat. No. 3,273,064 mentioned above. In this radio relay system, channels 1, 2 and 3 emanate from a modulation device (not shown) and having the respective band center frequencies $f_1$, $f_2$ and $f_3$ which are fed to a plurality of transmitter terminals SA1 to SA3 to form a high frequency group. This group is conducted via a cascade of circulators Z1, Z2 and Z3 to a terminal 10 of a transmitting antenna 15. Individual channel filter elements I, II and III are provided for each of the respective channels. Each filter group comprises a band-pass filter (BP1–BP3) in series with an associated directional line RL, the separate band-pass filters being connected to their respective circulators Z1–Z3. Thus, the channel filter element I contains the band-pass filter BP1, which is tuned to the center channel frequency $f_1$ of channel I, and whose output is conducted to the circulator Z1. The other channel filter elements II and III are constructed in precisely the same way, so that therefore the band-pass filter BP2 is tuned to the center frequency $f_2$ of channel 2 and the band-pass filter BP3 is tuned to the center frequency $f_3$ of channel 3. The direction of circulation of the individual circulators Z1 to Z3 is indicated by the arrows marked with the reference numeral 12, and is such that each individual channel is totally reflected at the outputs of the subsequently connected band-pass filters. An absorber A is connected at the free terminal of the circulator furthest removed from the antenna to terminate the cascade. The receiving station is of a similar construction and those component assemblies corresponding to similar assemblies at the transmitting station have similar references provided with an additional prime (′) notation. Thus, as a result of the division of the channels which is effected at the receiving end, the channel 1 is available at the output EE1 of the channel filter element 1′, and, correspondingly, the channels 2 and 3 are available at the outputs EE2 and EE3 of the other channel filter elements. From these outputs, conversion is then effected into the appropriate intermediate frequency in the particular receivers connected to the outputs EE1 to EE3.

In order that the pass attenuation between a particular transmitter input SA and the associated receiver output EE should remain as low as possible, the transit time distortions $\Delta\tau_g$ are not balanced until after the conversion of the high frequency channels 1 to 3 into the intermediate frequency state. For improved clarity, the contributions of the individual filter elements to the transit time distortion $\Delta\tau$ and their total $\Delta\tau_g$ is represented separately for each high frequency channel plotted against the frequency $f$. It will be seen that while the total curve for the central channel 2 is such that a symmetrical transit time distortion results, the marginal channels, i.e., the channel 1 which is lowest in frequency and the channel 3 which is highest in frequency within the high frequency group, suffer asymmetrical transit time distortions. To obtain a simplified illustration, FIG. 1 and FIG. 2 each illustrate an arrangement with only three channels. Naturally a larger number of individual channels can be linked at the transmitting end and separated at the receiving end in exactly the same way, in which case the conditions illustrated in FIG. 1 for channel 2 will apply to all the middle channels of the group.

As already mentioned in the introduction, the asymmetrical transit time distortion in the marginal channels is found to be disturbing, in particular when it is desired to change the total component assemblies forming the corrector networks, since the arrangement shown in FIG. 1, results in the need for additional transit time correctors giving additional compensation in the transmission link.

Figure 2:
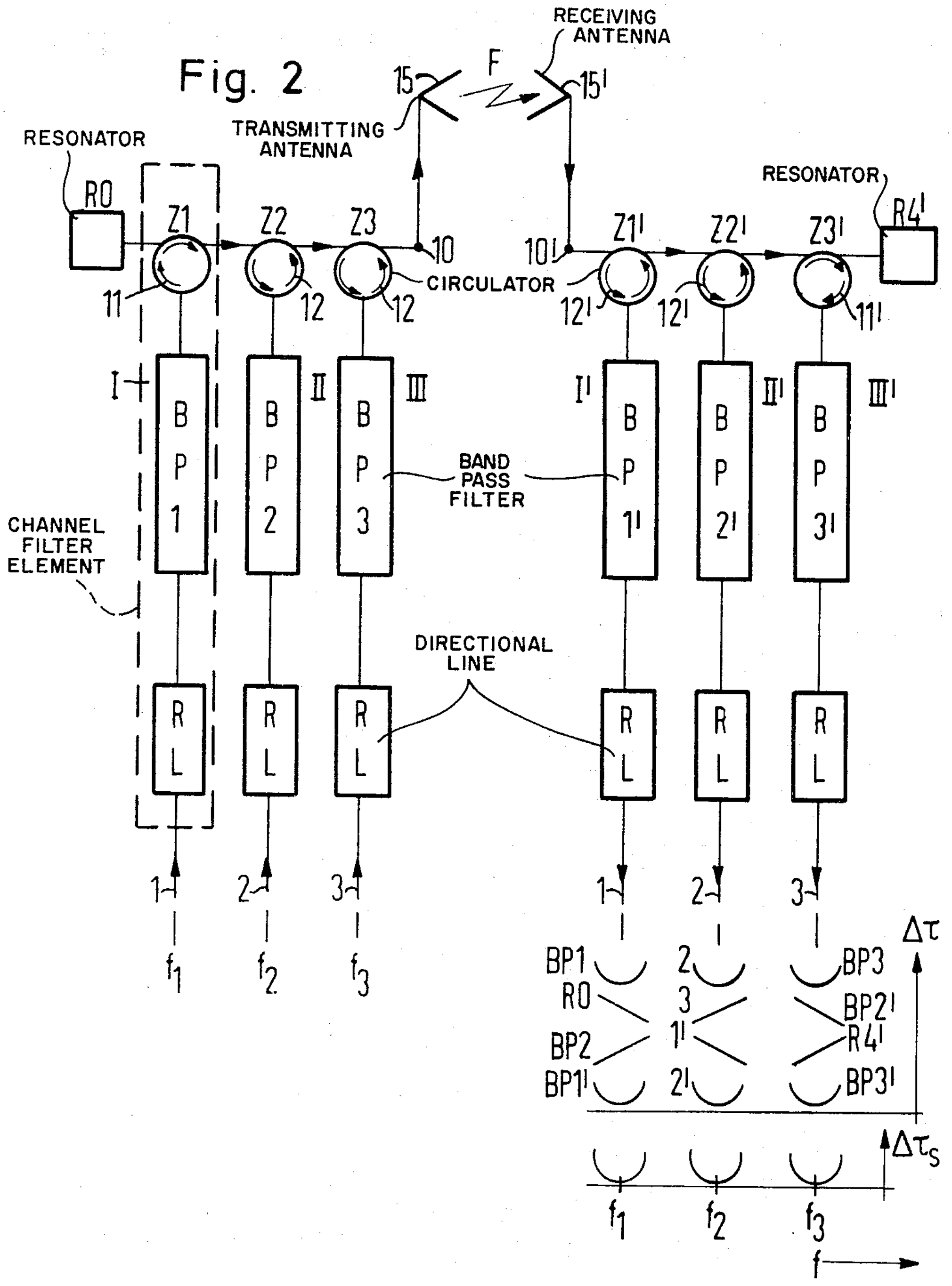
FIG. 2 similarly illustrates one exemplary embodiment of a radio link constructed in accordance with the invention.

These difficulties are avoided in a relatively simple manner by the exemplary embodiment of a radio relay system constructed in accordance with the invention, as illustrated in FIG. 2. The construction of the individual component assemblies is selected to be substantially identical to that of the example illustrated in FIG. 1, so that those elements which perform the same functions have been provided with the same reference numerals as those in FIG. 1 so that to this extent the description provided for the exemplary embodiment shown in FIG. 1 also applies to the exemplary embodiment shown in FIG. 2. However, it should be emphasized that in each cascade, considered from the transmitting and receiving antenna terminals 10 and 10′ respectively, the sequence of the individual channel filter elements assigned to the particular high frequency channels is selected to be mutually opposed at the transmitting end to that at the receiving end. Futhermore, the channel filter element for the highest channel frequency $f_3$, thus for channel 3, is arranged to lie adjacent to the antenna terminal 10, and that the channel filter element for the lowest channel frequency, namely the channel 1 with a center frequency $f_1$ is arranged to be the furthest removed from the antenna terminal 10. The same conditions may be achieved if the reverse arrangement is used for the marginal channels providing the corresponding reversed arrangement is also selected at the receiving end. As also shown in FIG. 2, the directions of circulation of the circulators $Z_2$ and $Z_3$ in the transmitter station cascade, and the circulators Z1′ and Z2′ in the receiving cascade are mutually similar, as for the exemplary known arrangement shown in FIG. 1, as is shown in detail by circular arrows 12 and 12′. However an essential feature of the exemplary arrangement shown in FIG. 2 is that the terminal circulators Z1 and 3′ which transmit the marginal channels possess a circulating direction which is opposed to that of the other circulators in their respective cascades, as is indicated by circular arrows 11 and 11′. To the circulator Z1 there is connected a terminating resonator R0 at that part which, considered in the direction of circulation, is adjacent to the connection arm leading to the band pass filter BP1. In precisely the same way, at the receiving end, the circulator Z3′ is assigned a resonator R4′ which is connected in such a way that, considered in the direction of circulation of the circulator Z3′, it is connected in series with the port leading to the bandpass filter BP3′. The same compensating mode of operation may be achieved if the direction of circulation of the circulators Z1 and Z3′ is reversed to correspond with the other circulators in each cascade, but the terminals for the band-pass filter and resonator are interchanged in each case. The resonators R0 and R4′ can take the form of any type of microwave resonator and therefore it is not necessary to give futher details of their construction, but advantageously they each take the form of a resonator which is at least of a similar design to the resonator of the associated band-pass filter BP1 and BP3′, respectively, connected to the respective circulators Z1 and Z3′. In the tuning of the resonators R0 and R4′, care should be taken to see that in the frequency range of the lowest or highest frequency channel it simulates, channel 1 or channel 3, as the case may be, and homologously to its band center frequency $f_1$ or $f_3$, a transit time behavior is equal to that caused by the particular channel filter element II or II′ which is adjacent in the cascade. This may be achieved if the resonant frequency of the resonator R0 is tuned to a frequency which lies below the frequency $f_1$ and possesses approximately the same frequency spacing below the frequency $f_1$ as does the channel frequency $f_2$ above $f_1$. Corresponding conditions apply to the resonator R4′, whose resonant frequency should be higher than the frequency $f_3$ of the channel 3 by an interval that substantially corresponds to the frequency interval between the channels 2 and 3.

The effect of this special interconnection is also shown in FIG. 2 at the output of the receiving circuit where the transit time values $\Delta\tau$ of the individual elements which determine the transit time behavior are plotted against the frequency $f$. As will be seen from the curves, each of the individual band-pass filters BP1, BP2 and BP3 has a transit time behavior which is approximately parabolic. The band-pass filters BP1′ to BP3′ also have the same type of effect. As a result of the special tuning, the transit time behavior of the resonators R0 and R4′ is now opposed to the transit time quantity of the band-pass filters BP2 and BP2′. Thus the total curve $\Delta\tau_g$ is identical for all of the channels. This will also apply to systems in which more than three channels are combined to form a common high frequency group.

Although I have described my invention by reference to a specific illustrative embodiment, many changes and modifications of the invention may become apparent to those skilled in the art without departing from the spirit and scope of the invention. It is therefore intended that the patent warranted hereon include all such changes and modifications which may reasonably and properly be included within the scope of my contribution to the art.

What I claim is:

1. A radio relay system in which several adjacent high frequency channels are combined to form a high frequency group, comprising: a transmitting station including a transmitting antenna, a plurality of first three-arm circulators connected in cascade to said antenna, and a plurality of first channel band pass filters each connected to an arm of a respective first circulator, said first filters arranged with the filter centered at the highest channel frequency connected to the first circulator adjacent said transmitting antenna and the filter centered at the lowest channel frequency connected to the circulator farthest from said transmitting antenna; and a receiving station including a receiving antenna, a plurality of second three-arm circulators connected in cascade to said receiving antenna, and a plurality of second channel band pass filters each connected to an arm of a respective second circulator, said second filters arranged with the filter centered at the lowest channel frequency connected to that second circulator which is adjacent said receiving antenna and the filter of the highest channel frequency connected to the circulator which is farthest from said receiving antenna, the circulation direction of said farthest first and second circulators being opposite to that of the remaining circulators of the respective circulator cascades, a first resonator in said transmitting station connected to the arm of said farthest first circulator which follows the arm connected to the respective channel filter as viewed in the direction of circulation and a second resonator in said receiving station connected to the arm of said farthest second circulator which precedes the arm which is connected to the respective channel filter as viewed in the direction of circulation.

2. A radio relay system according to claim 1, wherein said resonators have the same structure as the filters connected to the respective circulators.

3. A radio relay system in which several adjacent high frequency channels are combined to form a high frequency group, comprising: a transmitting station including a transmitting antenna, a plurality of first three-arm circulators connected in cascade to said antenna, and a plurality of first channel band pass filters each connected to an arm of a respective first circulator, said first filters arranged with the filter centered at the highest channel frequency connected to the first circulator adjacent said transmitting antenna and the filter of the lowest channel frequency connected to the circulator which is farthest from said transmitting antenna; and a receiving station including a receiving antenna, a plurality of second three-arm circulators connected in cascade to said receiving antenna, and a plurality of second channel band pass filters connected to an arm of a respective second circulator, said second filters arranged with the filter of the lowest channel frequency connected to that second circulator which is adjacent said receiving antenna and the filter of the highest channel frequency connected to the circulator which is farthest from said receiving antenna, the circulation direction of said circulators being the same in the respective circulator cascades, a first resonator in said transmitting station connected to the arm of said farthest first circulator which follows the arm which is connected the respective channel filter as viewed in the direction of circulation, and a second resonator in said receiving station connected to the arm of said farthest second circulator which precedes the arm which is connected to the respective channel filter as viewed in the direction of circulation.

4. A radio relay system according to claim 3, wherein said resonators have the same structure as the filters which are connected to the respective farthest circulators.

* * * * *